UNITED STATES PATENT OFFICE.

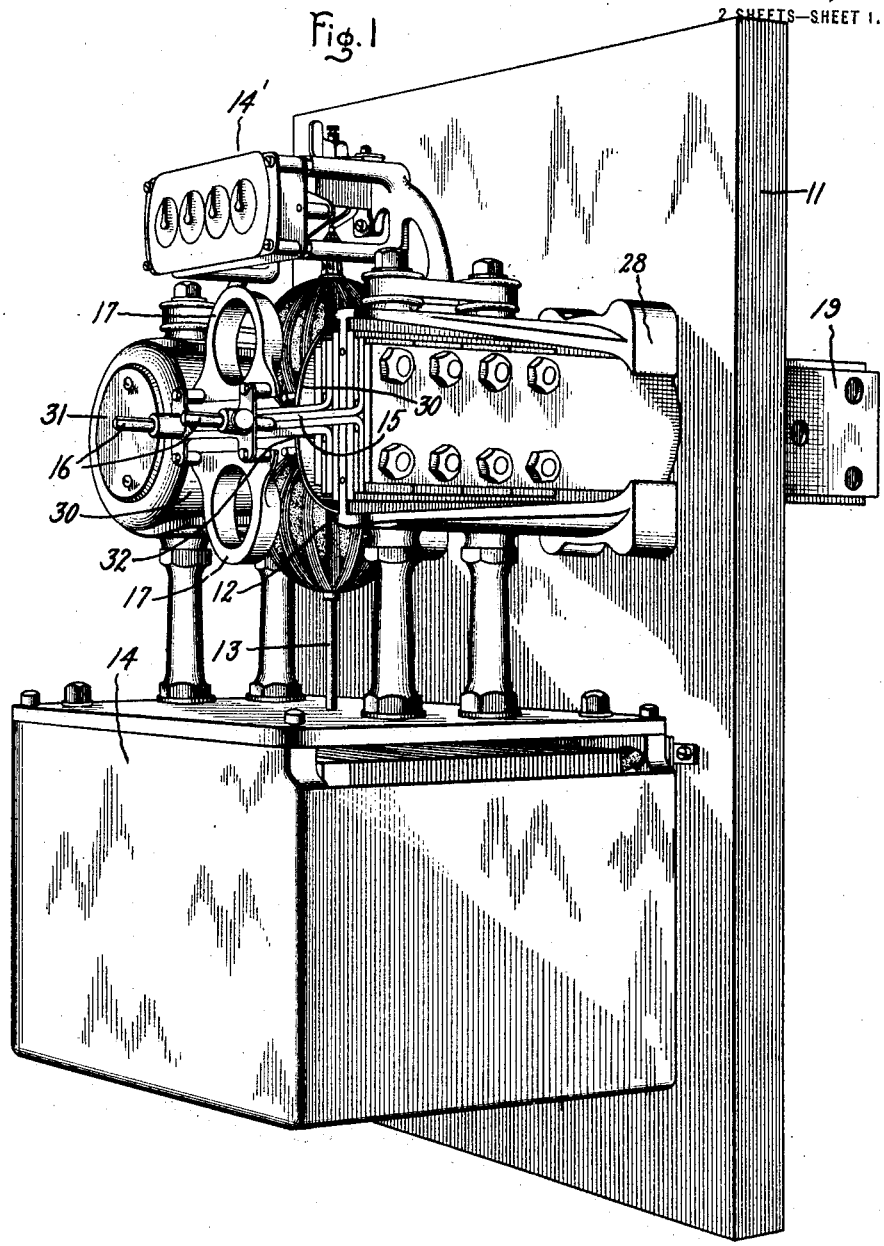

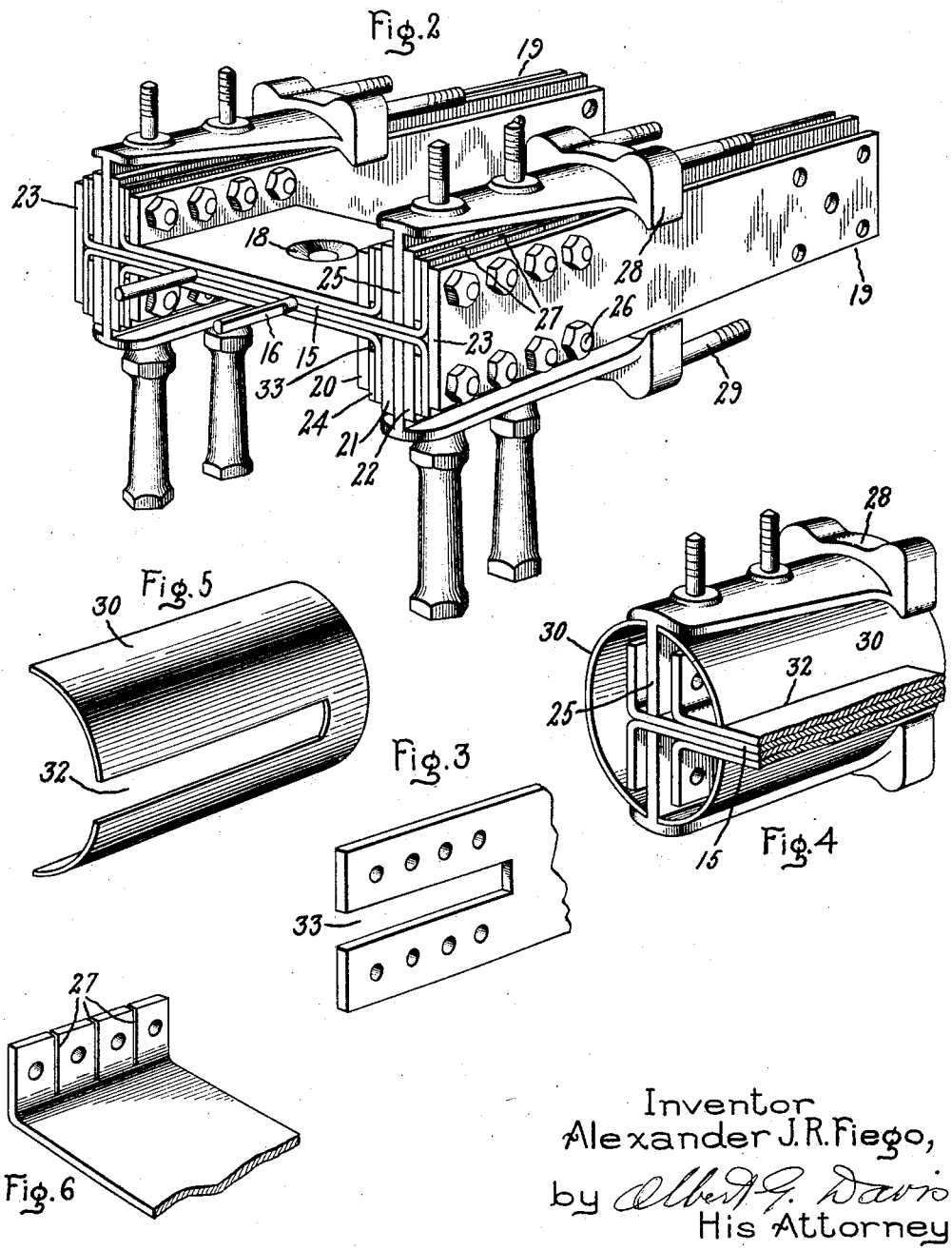

ALEXANDER J. R. FIEGO, OF LYNN, MASSACHUSETTS, ASSIGNOR TO GENERAL ELECTRIC COMPANY, A CORPORATION OF NEW YORK.

ELECTRICAL MEASURING INSTRUMENT.

1,394,983.

Specification of Letters Patent. Patented Oct. 25, 1921.

Application filed November 24, 1920. Serial No. 426,144.

*To all whom it may concern:*

Be it known that I, ALEXANDER J. R. FIEGO, a citizen of the United States, residing at Lynn, county of Essex, State of Massachusetts, have invented certain new and useful Improvements in Electrical Measuring Instruments, of which the following is a specification.

My invention relates to electrical measuring instruments and more particularly to direct current watthour meters of the commutator type, in which there are relatively movable coils.

In large capacity direct current watthour meters the current coil, which is usually the stationary element, comprises a conductor of sufficiently large cross section to carry a current commensurate with that flowing to the load being metered. In some types of these meters the current carrying conductor and its terminal studs have heretofore been machined from one solid piece of conducting material, such as copper, or else these members have been held together by solder. A construction of a large capacity meter is shown, for example, in the meter described in the patent granted to W. H. Pratt, No. 859,333, patented July 9, 1907. By means of my present invention such wasteful use of copper as is necessary to shape both the connection studs and the conducting bar out of a solid piece is obviated and instead standard copper strips are used to build up the conductor as well as the terminals. This is especially applicable to the type of meter shown in the patent referred to hereinbefore, since the current coil comprises in such a case merely a flat piece of conducting material which is so placed with regard to the rotatably mounted potential coil that it influences this potential coil to cause it to rotate at a rate proportional to the consumption of energy. Besides reducing the cost of labor and material for the construction of the current conductor, another advantage is that there are no soldered joints or contacts between the bar and its terminals, and a good, permanent contact not affected by bad conditions of service, may be made by an ordinary bolted construction. The accuracy of the meter is thus maintained, since no excessive resistance can develop at any of the joints, as in the case where solder alone is relied upon.

For a better understanding of my invention, reference is to be had to the specification in connection with the accompanying drawings, in which Figure 1 is a perspective view of a completed meter showing the application of my invention; Fig. 2 is a perspective view of the laminated construction of the current conductor and its terminals; Fig. 3 is a view of a portion of one of the terminal laminations; Fig. 4 is a partial view illustrating how the covers may be applied to the conductor; Fig. 5 is a perspective view of one of the covers; and Fig. 6 is a perspective view of one of the strips making up the current conductor.

Referring now more in detail to the drawings in which like reference characters refer to like parts throughout, in this instance I show a large capacity commutator type watthour meter mounted upon a supporting board 11 and having a pair of rotatably mounted potential coils 12. The shaft 13 of this rotatable element is appropriately supported in the usual manner and extends into the boxlike structure 14 which houses the damping elements of the meter. At its upper end the shaft 13 is mechanically connected with the register and train 14'. In this instance I show a potential element divided into two spherically-wound coils, one placed above and the other below the current carrying element or series coil 15 of the meter. The current carrying element comprises laminated strips of copper having bent up portions as clearly shown in Figs. 2 and 6 so as to form U-shaped members. Saw cuts 27 are provided in the bent-up portions to make these portions more pliable. These laminations are so placed that a symmetrical structure is formed about the longitudinal center line of the current conductor. The straight portions of the series coil 15 are made use of to support rods 16 upon which are adjustably mounted the coil supports 17 carrying coils for the compensation of static friction in a well known manner. Furthermore, the shaft 13 of the instrument passes completely through the compound conductor 15 in which an appropriately shaped aperture 18 is provided for this purpose.

Forming the terminals 19 of the conductor 15 are a series of flat copper strips interleaved with the bent up portions of the laminations forming the conductor 15. In the present instance I show four laminations for each of the terminals and four laminations for the series conductor. The laminations forming the right-hand terminal are marked 20, 21, 22 and 23. It should be noted that these copper strips are spaced apart from each other by an amount equal to the thickness of each bar, so that busbars may be interleaved with them in the rear of the instrument. For this purpose it may be necessary to use filler bars such as shown at 24 and 25 which extend about as far as the front of the base 11. The interleaving of the strips making up the terminals 19 with the strips making up the series conductor 15 provides an easy method for clamping them together and for this purpose a plurality of bolts 26 is used. These clamping bolts may be independently tightened, since sawcuts 27 are provided on the bent up portions of the laminations as shown in Figs. 2 and 6. The entire arrangement is such that the space occupied by the strips which make up the terminal may readily pass through a round hole drilled in the base 11. It should also be noted that all of the strips except the outermost strip 23 making up the terminal are slotted in the manner shown at 33 and in Fig. 3 so that these strips may accommodate the laminations making up the conductor 15 in these slots 33. However, other means for building up the terminals or laminations may be utilized, but I find that the means I have shown for doing this is desirable.

To support appropriate covers for the terminals, I make use of the members or brackets 28 which are supported by means of studs 29 passing through the base 11. These brackets 28 are so arranged that they partially embrace the laminated conductors as shown clearly in Fig. 2 and serve as a retaining means for the thin cylindrical cover members 30, having substantially semi-circular cross sections. Furthermore they may conveniently be made integral with the central filler bar 25, as shown. Those two covers 30 which come nearest the center of the instrument are slotted as shown at 32 and in Figs. 4 and 5, to allow them to accommodate the conductor 15 within these slots 32. When these members 30 are assembled, they must be slipped upon the conductor 15 from the rear. The entire arrangement of covers and strips comprising the conductor 15 is clearly illustrated in Fig. 4. In this figure the strips making up the terminal bars 19 as well as the filler bars except bar 25 are omitted, in order to clarify the figure. Since the bars 25 are cast integral with the brackets 28, these brackets serve as supports for the compound conductor 15 and for the terminals 19. In this way a good mechanical construction is obtained. At the front of the laminated strips a dish-shaped member 31 holding together the members 30 may be appropriately fastened, as by screws to the copper strips, so as to give the instrument a neat and finished appearance. These bracket members 28 also serve as supporting means for the boxlike structure 14 and for the registering mechanism 14′ and the upper pivot of the shaft 13.

From the foregoing description it is evident that I have provided an extremely simple, compact and inexpensive construction for meters of this character. I am able primarily to do this by laminating the heavy current carrying parts of the apparatus. This not only makes possible an inexpensive construction but also renders the instrument much more accurate even after extended periods of service, since there are no soldered contacts which may deteriorate should the meter be operated under adverse conditions.

While I have shown in the accompanying drawings the preferred embodiment of my invention, it is not limited thereto and I aim to embrace in the appended claims all modifications falling fairly within the scope of my invention.

What I claim as new and desire to secure by Letters Patent of the United States, is,—

1. An electrical watthour meter of the commutator type, comprising a rotatably mounted potential coil, a stationary conductor for carrying a current proportional to that being metered, arranged to influence said rotatably mounted coil, and terminals for said conductor characterized by the fact that the stationary conductor, as well as the terminals therefor are laminated, and that the terminal laminations are interleaved with the conductor laminations.

2. In an electrical watthour meter of the commutator type, a laminated conductor forming the series coil of the instrument, the laminations of said conductor having bent-up portions, and terminals for said conductor also formed of laminations interleaved with the said bent-up portions.

3. In an electrical watthour meter of the commutator type, a laminated conductor forming the series coil of the instrument, and laminations of said conductor being U-shaped and placed symmetrically about the longitudinal center line of the conductor, and terminals for said conductor also formed of laminations interleaved with the legs of the U-shaped laminations.

4. In an electrical watthour meter of the commutator type, a laminated series coil, terminals for said coil formed of strips interleaved with the laminations of the series coil, and supports for said coil and terminals having a strip also interleaved with the laminations, and fastening means passing through the strips.

In witness whereof, I have hereunto set my hand this 19th day of November, 1920.

ALEXANDER J. R. FIEGO.